United States Patent Office.

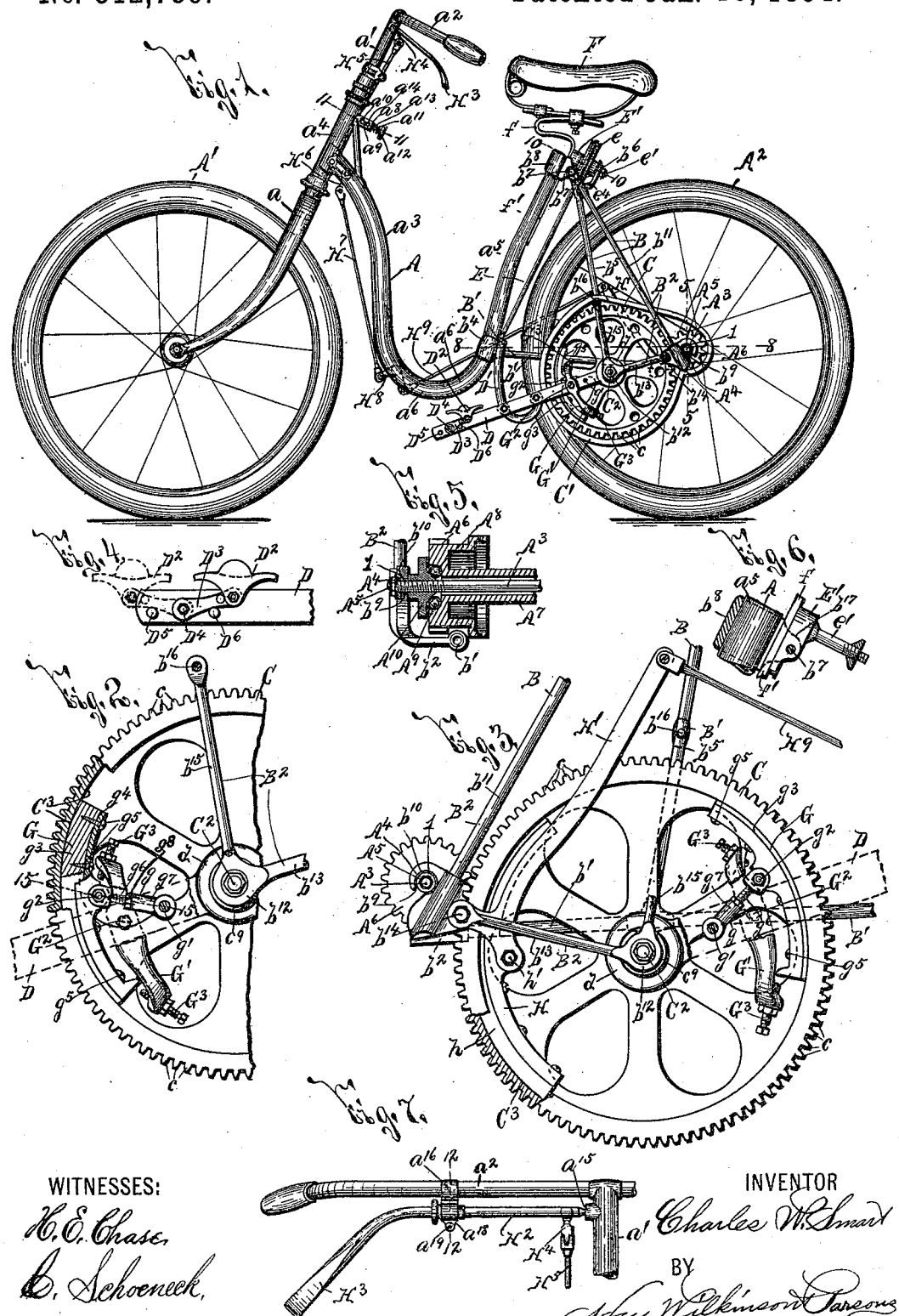

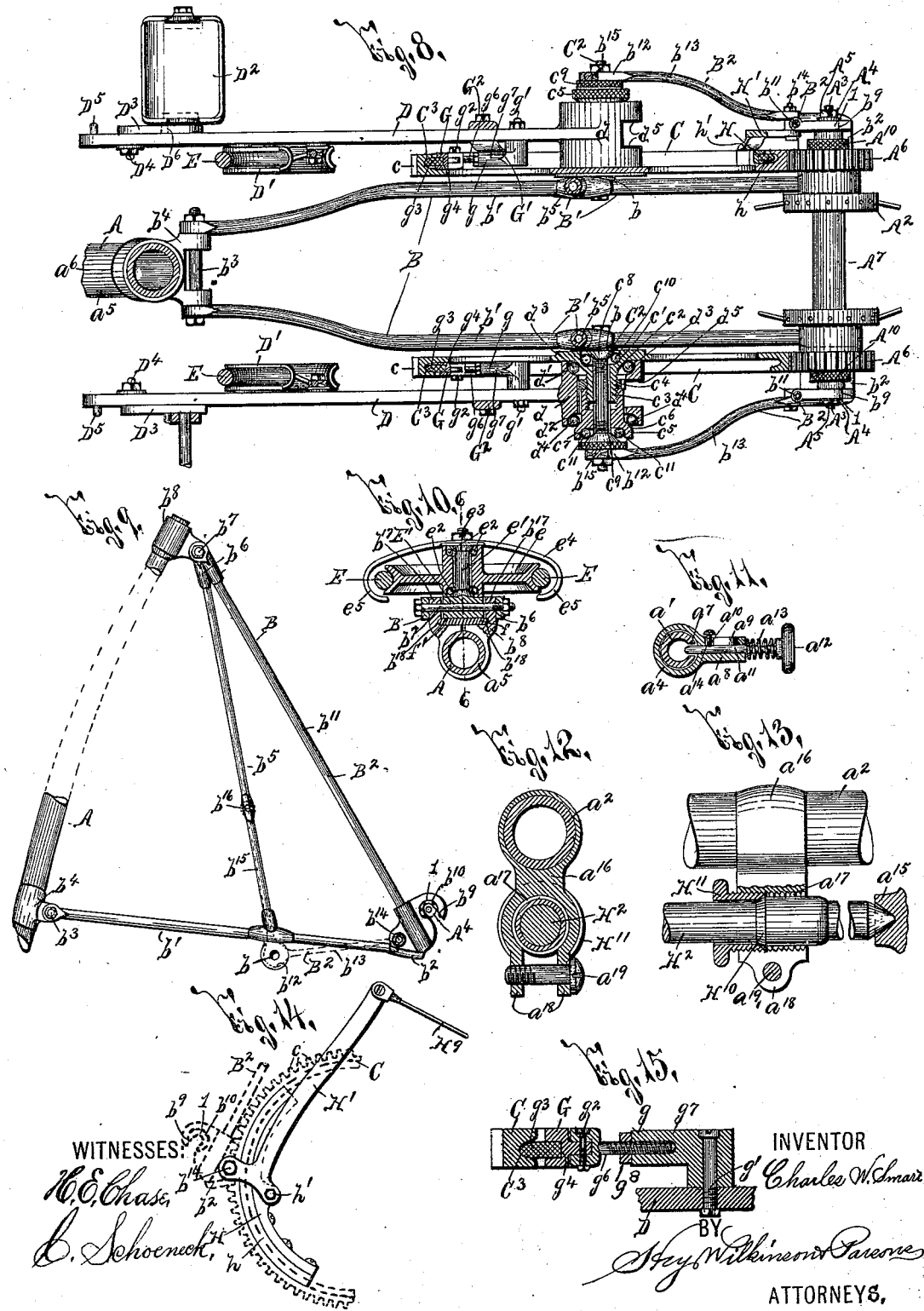

CHARLES W. SMART, OF CARBONDALE, ILLINOIS.

VEHICLE.

SPECIFICATION forming part of Letters Patent No. 512,759, dated January 16, 1894.

Application filed December 29, 1892. Serial No. 456,646. (No model.)

*To all whom it may concern:*

Be it known that I, CHARLES W. SMART, of Carbondale, in the county of Jackson, in the State of Illinois, have invented new and useful Improvements in Vehicles, of which the following, taken in connection with the accompanying drawings, is a full, clear, and exact description.

My invention relates to improvements in vehicles, and particularly the class of bicycles and tricycles, and has for its object the production of a simple and effective device whereby reciprocating motion is quickly and easily transferred to rotary motion without material loss of power or any liability of dead centers, and the production of a simple and practical brake for checking the movement of the bicycle; and to this end the invention consists, in the detail construction and arrangement of the parts, all as hereinafter more particularly described and pointed out in the claims.

In describing this invention, reference is had to the accompanying drawings, forming a part of this specification, in which, like letters and figures indicate corresponding parts in all the views.

Figure 1 is a side elevation of a bicycle provided with my improved invention, clearly illustrating the relative construction and arrangement of its component parts. Fig. 2 is a detail elevation, partly in section, of a portion of one of the actuating wheels, and the clutch section or shoe for engaging said wheel. Fig. 3 is a detail elevation of the opposite actuating wheel, the clutch section or shoe for engaging said wheel, the brake-shoe for stopping the movement of the wheel, and the lever carrying said brake-shoe. Fig. 4 is an elevation of the detached end of one of the clutch section supporting levers. Fig. 5 is a sectional view, taken on line 5—5, Fig. 1. Fig. 6 is a detail vertical sectional view, taken on line 6—6, Fig. 10, the pulley and the guide for the flexible connection running over the pulley being removed. Fig. 7 is an elevation of the upper end of the steering rod, one end of the handle bar, and the brake operating spindle. Fig. 8 is a horizontal sectional view, taken on line 8—8, Fig. 1. Fig. 9 is an elevation, partly in section, of a portion of the frame and the bracing frame for supporting one of the actuating wheels, a portion of the outer division of said bracing frame being shown by dotted lines. Fig. 10 is a horizontal sectional view, taken on line 10—10, Fig. 1. Fig. 11 is a horizontal vertical sectional view, taken on line 11—11, Fig. 1. Fig. 12 is a vertical sectional view, taken on line 12—12, Fig. 7. Fig. 13 is an elevation, partly in section, of a detached portion of one end of the handle bar, the arm secured to said portion of the handle bar, and the portion of the brake operating spindle journaled in said arm. Fig. 14 is an elevation of the detached brake-shoe and its operating lever, a portion of the actuating wheel engaged by said brake-shoe being shown by dotted lines; and Fig. 15 is a horizontal sectional view, taken on line 15—15, Fig. 2.

The frame —A— of the bicycle here shown as provided with my invention, may be of any desirable form, size and construction suitable for permitting attachment thereto of my invention. As here illustrated, this frame is provided with a front fork —$a$—, a steering rod —$a'$— secured in the usual manner to the front fork, a handle bar —$a^2$— upon the upper end of the steering rod, a downwardly extending arm or bar —$a^3$— at the rear of the fork —$a$— provided with a head —$a^4$— in which the steering rod —$a'$— is journaled in the usual manner, and an upwardly extending arm or bar —$a^5$— at the rear of the former arm —$a^3$— having its lower end connected to the arm —$a^3$— by the curved bar —$a^6$—. The front wheel —A'— is secured in the usual manner to the fork —$a$— and the rear wheel —A$^2$— is secured to the frame —A— by bracing frames —B—B— which are arranged on opposite sides of the forward portion of said wheel and each consist of an inner division or frame —B'— and an outer division or frame —B$^2$—. Each of these inner frames —B'— is composed of a bearing —$b$— for the adjacent actuating wheel —C—, presently described; a lower substantially horizontal bar —$b'$— having its central portion secured to the bearing —$b$—, its rear extremity extended backwardly and formed with an inward projecting arm —$b^2$— secured to a bearing —1— for supporting the adjacent end of the axle —$A^3$— of the rear wheel —$A^2$— and having its opposite extremity extended forwardly and removably secured by a bolt —$b^3$— to a clip —$b^4$— upon the frame arm —$a^5$—; and the rear upwardly inclining bar —$b^5$— extending from the bearing —$b$— to a head —$b^6$— which, as presently described, is removably secured by a bolt —$b^7$— to a clip —$b^8$— upon the frame arm or bar —$a^5$—. Each of the bearings —1— is provided with an upwardly inclining slot —$b^9$— extending inwardly for permitting the ready entrance of the adjacent end of the axle —$A^3$— and is formed in its outer face with a groove or recess —$b^{10}$— at the edge of the upper end of said slot —$b^9$— for receiving a shoulder —$A^4$—, Figs. 5 and 9, movable lengthwise on the adjacent end of the axle —$A^3$—. A nut —$A^5$— also movable on said end of the axle, bears against said shoulder —$A^4$— and forces the same within the recess —$b^{10}$—, thereby securing said end of the axle in operative position within the bearing —1—.

Each of the outer bracing divisions or frames —$B^2$— is arranged at the outside of the corresponding actuating wheel —C—, presently described, and consists of a rear bar —$b^{11}$— extending upwardly from the bearing —1— to the head —$b^6$—, a bearing —$b^{12}$— for for supporting said actuating wheel; a rearwardly extending arm or bar —$b^{13}$— extending to the rear from said bearing $b^{12}$ and having its rear end removably secured by a bolt —$b^{14}$— to the bearing —1— and an upwardly extending arm —$b^{15}$— having its upper end removably secured by a bolt —$b^{16}$— to the bracing bar —$b^5$—. This is a particularly strong and practical form of frame for securing the rear or driving wheel to the frame —A— and for supporting the actuating wheels —C—C—, presently described, since as will be readily understood, a bar extends forwardly from each of the bearings for said wheels to one point on the frame and a separate bar extends upwardly and forwardly from each of said bearings to another point on said frame, thereby affording great rigidity and also presenting a neat and pleasing appearance. Moreover, each of the outer frames —$B^2$—$B^2$— may be readily removed to permit access to the actuating wheels, and if desired, the inner frames —B'—B'— may also be removed for permitting access to the driving wheel.

It is frequently desirable to have the bicycle stand alone, and to facilitate this result, to lock the steering rod —$a'$— from movement within the head —$a^4$—. Consequently, the steering rod is formed with a socket —$a^7$— and the head —$a^4$— is provided with a rearwardly extending hub —$a^8$— formed with a lengthwise slot —$a^9$— having an upturned extremity —$a^{10}$—. A locking bolt —$a^{11}$— formed with a hand engaging head —$a^{12}$—, is movable within the hub —$a^8$— and its inner end is normally forced out of engagement with the socket —$a^7$— by a spring —$a^{13}$— interposed between the face of the hub —$a^8$— and the hand engaging portion —$a^{12}$— of the bolt —$a^{11}$—. The bolt —$a^{11}$— is provided with a lug —$a^{14}$— which is movable within the slot —$a^9$— and when registered with the upturned extremity —$a^{10}$— of said slot, prevents the spring —$a^{13}$— from movement and holds the inner end of the locking bolt —$a^{11}$— in engagement with the socket —$a^7$—.

—C—C— are actuating wheels which are arranged on opposite sides of the driving wheel —$A^2$— and are suitably connected to said driving wheel for rotating the same as said wheels are revolved. As preferably constructed, however, the wheels —C—C— are formed upon their outer peripheral faces with teeth —c— which mesh with pinions —$A^6$—$A^6$— formed integral with the hub —$A^7$— of the rear wheel —$A^2$—. These pinions —$A^6$—$A^6$— are formed on their outer sides with bearing faces —$A^8$— against which anti-friction balls —$A^9$— are forced by nuts —$A^{10}$—$A^{10}$— movable on the ends of the axle —$A^3$— of the rear driving wheel —$A^2$—. The teeth —c— of the actuating wheels —C—C— and the pinions —$A^6$—$A^6$— are shielded by any suitable construction of guards —C'—C'— which may be suitably secured to the bracing frames —B—B—. The actuating wheels —C—C— are journaled upon axles —$C^2$—$C^2$— having their inner ends supported by the bearings —$b$—$b$— of the inner bracing divisions or frames —B'—B'— and their outer ends supported by the bearings —$b^{12}$—$b^{12}$— of the outer bracing divisions or frames —$B^2$—$B^2$—. The wheels —C—C— are each formed with inner and outer annular bearing faces —$c'$—$c^2$— and a projecting hub —$c^3$—. Movable on each of said hubs —$c^3$— is a collar $c^5$ formed with a socket for receiving the projecting end of said hub —$c^3$— and with inner and outer annular bearing faces —$c^6$—$c^7$—; and $c^4$ is a jam nut encircling said hub at the inner end of the collar. Each of the spindles —$C^2$—$C^2$— for the actuating wheels —C—C— is formed with inner and outer nuts —$c^8$—$c^9$— and interposed between the inner bearing face —$c'$— of each of said wheels —C— and the inner nut —$c^8$—, are anti-friction balls —$c^{10}$—, and interposed between the outer bearing faces —$c^7$— and the adjacent face of the outer nut —$c^9$— are anti-friction balls —$c^{11}$—.

Arranged on opposite sides of the driving wheel —$A^2$— are actuating levers —D D— each of which is formed with a hub —$d$— encircling the projecting hub —$c^3$— of the adjacent actuating wheel —C— and the nut and collar —$c^4$—$c^5$— engaged with said hub. Each of these hubs —$d$— is formed with inner and outer bearing faces —$d'$—$d^2$— and interposed between the inner face —$d'$— and the face —$c^2$— of the adjacent wheels —C— and between the outer face —$d^2$— and the adjacent face of the collar —$c^5$— are anti-friction balls —$d^3$—$d^4$—. It is frequently desirable to tighten the jam nut —$c^4$— and to facilitate this result, the rear end of the hub —$d$— is formed with an opening —$d^5$— aligned with said nut —$c^4$— for permitting access thereto.

The peculiar construction and arrangement of the actuating wheel hubs, the nuts engaged therewith, the spindles for supporting said actuating wheels, the actuating levers journaled upon the projecting hubs of the spindles and the ball bearings for the respective parts are particularly practical, durable and efficient.

As previously described, the rear ends of the levers —D—D— are journaled upon the projecting hubs of the actuating wheels —C—C— and in order that the levers may move simultaneously and oppositely they are formed with curved arms —D'—D'— having concave front faces to which are suitably secured the opposite ends of a flexible connection —E— having its central portion passed over a pulley —$e$— journaled upon a spindle —$e'$— projecting rearwardly from a support —E'— suitably secured to the clip —$b^8$— previously mentioned. This clip is preferably formed with separated ears —$b^{17}$—$b^{17}$— between which the front extremity of the support —E'— is inserted. The upper ends of the heads —$b^6$—$b^6$—, previously described, secured to the upper ends of the bracing bars —$b^5$—$b^{11}$—, —$b^5$—$b^{11}$— of the bracing frames —B—B— are arranged at the outside of the ears —$b^{17}$—$b^{17}$— and the bolt —$b^7$—, previously described is passed through the upper ends of the heads —$b^6$—$b^6$—, the ears —$b^{17}$—$b^{17}$— and through the forward portion of the support —E'—. Suitable anti-friction balls —$e^2$—$e^2$— are interposed between ordinary annular bearing faces upon the hub of the pulley —$e$— and the usual ball bearing shoulders upon the spindle —$e'$—, and a nut —$e^3$— is engaged with the outer end of the spindle —$e'$— for securing the outer set of balls and the pulley —$e$— in position. A suitable guide —$e^4$— is arranged with its central portion mounted upon the spindle —$e'$— in front of the nut —$e^3$— and its ends —$e^5$—$e^5$— are bent around the peripheral face of the pulley —$e$— for guiding the flexible connection —E— in its movement. The clip —$b^8$— serves also as a clamping means for a suitable seat support —$f$— upon which is mounted any desirable construction of seat —F—. The seat support —$f$— is formed with a depending arm —$f'$— having its front face bearing against the rear face of the upper extremity of the frame bar or arm —$a^5$—. The ears —$b^{17}$—$b^{17}$— of the clip —$b^8$ are formed with grooves —$b^{18}$—$b^{18}$— in their inner faces for receiving the edges of the interposed flat portion of said arm —$f'$—. As the bolt —$b^7$— secures the heads —$b^6$—$b^6$— and the pulley support —E'— in position, it also clamps the seat support —$f$— in position and when desired to adjust the position of the seat, the usual nut upon the bolt —$b^7$— is unscrewed so as to permit the ears —$b^{17}$—$b^{17}$— to spring apart and permit the up and down movement of the arm —$f'$— between the ears —$b^{17}$—$b^{17}$—.

The forward extremity of each of the levers —D— is provided with a foot engaging portion —$D^2$— which is preferably hinged upon the outer end of a link —$D^3$— having its other end hinged at —$D^4$— to the lever —D— and its central portion adapted to rest upon forward and rearward laterally projecting support —$D^5$—$D^6$— upon said lever —D— in order that the foot support may be either approximated to, or separated from, the hub —$d$— of the lever —D— for affording a less or greater amount of leverage.

As will be readily understood, when one lever —D— is depressed, the other is elevated by means of the connection —E— and as will be immediately described, these levers are so connected to the actuating wheels —C—C— that as one lever is being depressed, the opposite lever is connected to rotate upwardly the forward portion of the adjacent actuating wheel, and thereby revolve the driving or rear wheel —$A^2$— in the usual direction for moving the bicycle forwardly. This peculiar action of the levers —D—D— is particularly practical and effective, since the force exerted to press one lever downwardly is caused to rotate upwardly the forward portion of the actuating wheel —C— adjacent to the other lever and thus produce an upward strain upon said actuating wheel which is practically and effectively resisted by the bracing bar —$b^5$— extending upwardly from the bearing —$b$— for said wheel to the clip —$b^8$— on the frame arm or bar —$a^5$—. The connection between each of the levers —D— and the adjacent actuating wheel —C— consists of a clutch section or shoe —G— having its face disposed in a plane coincident with the arc of a circle and adapted to engage an annular bearing face —$C^3$— upon the corresponding wheel —C— and a link —$g$— having one end hinged at —$g'$— to said lever —D— and the other extended upwardly above a radial line drawn through the axis of said engaging wheel —C— and the hinge pin —$g'$— and hinged at —$g^2$— to the central portion of the shoe —G—. The annular engaging face —$C^3$— of the gear —C— preferably consists of the inclining sides of a groove provided in said actuating wheel and formed wedge shaped in cross section.

The face —$g^3$— of the clutch section of each of the shoes —G— is preferably formed of leather or other flexible material and is of suitable cross section to readily enter the groove —$C^3$— and operatively engage its sides. This face —$g^3$— is also removable and is secured in a groove —$g^4$— in the clutch section or shoe —G— by suitable fastening means as the screws —$g^5$—$g^5$—. Each of the links —$g$— consists of a tubular section —$g^7$—, a separate threaded section —$g^6$— extending into the tubular section, and a nut —$g^8$— screwed onto the threaded section against the end of the tubular section for permitting the longitudinal adjustment of said link. As one of the levers —D— moves upwardly, the link —g— secured thereto tends to move into a plane coincident with a radial line drawn through the hinge pin —$g^2$— of said link and the axis of the spindle —$C^2$—. Consequently, said link —g— clamps the flexible facing —$g^3$— of the attached clutch section firmly against the adjacent engaging face —$C^3$— of the groove in the adjacent actuating wheel —C— and locks together said lever and the actuating wheel provided with said groove, thereby rotating the driving wheel, which, as previously stated, is geared to said actuating wheel. As said lever moves downwardly, the link —g— swings on its pivot —$g'$—. The clutch section or shoe —G— carried by said link —g— then draws slightly inward out of engagement with the engaging face —$C^3$— on the actuating wheel —C—, without retarding the upward movement of the adjacent portion of said actuating wheel, which, it will be readily understood, is rotated by the driving wheel —$A^2$— meshing therewith, since said driving wheel is then rotated by the engagement therewith of the opposite actuating wheel.

For the purpose of preventing the clutch section —G— from pressing too closely against the adjacent engaging faces of the corresponding actuating wheel —C—, I provide suitable stops —$G'$—$G'$—. As best seen at Fig. 2, the central portion of each of said stops is secured at —$G^2$— to the adjacent lever —D— and is provided with projecting arms in which are movably mounted set screws —$G^3$—$G^3$—, the inner ends of which are engaged by the adjacent portions of the adjacent clutch section —G— as the same moves upwardly or downwardly. It will thus be clearly understood, that as one lever is forced downwardly, the opposite lever is rocked upwardly and the clutch section or shoe carried by the latter lever is engaged with the adjacent actuating wheel and serves to rotate the driving wheel. As the latter lever is forced downwardly, the clutch section previously engaged with the actuating wheel is disengaged therefrom and the opposite lever —D— is thrown upwardly and its clutch section is engaged with the adjacent actuating wheel for continuing the revolution of the driving wheel. This is a particularly practical and effective means of rotating the driving wheel —$A^2$— since the levers —D—D— are at no time upon a dead center and since the full power of the rider is utilized at any elevation of said levers. Moreover, it is evident that when coasting, the rider may allow his feet to rest upon the engaging portions of both levers without rocking either of said levers, and that in traveling over pavements and other similar and smooth surfaces at a slow speed where but little power is required, the rider may, if he desires, depress the levers only a slight distance instead of rocking them their full stroke.

—H— (Fig. 14) is a brake shoe which is provided with a yielding facing —h— for engaging the annular engaging face —$C^3$— in one of the actuating wheels —C—. This shoe is hinged at —$h'$— to a lever —$H'$— hinged to one of the bracing frames —B— where it connects with the bearing $l$ by the bolt —$b^{14}$— previously mentioned. —$H^2$— is a brake-spindle suitably connected to the lever —$H'$— for forcing the brake-shoe —$H'$— into and out of operative position. The spindle —$H^2$— is formed with a hand engaging arm —$H^3$— and in the present instance with a rigid radial arm —$H^4$— hinged to one end of a link —$H^5$— having its opposite end hinged to one arm of a bell-crank lever —$H^6$— movably supported upon the upper end of the frame arm or bar —$a^3$—. The opposite arm of the bell-crank lever is hinged to one end of a link —$H^7$— having its opposite end hinged to a bell-crank lever —$H^8$— movably supported upon the frame bar —$a^6$—. The opposite arm of the lever —$H^8$— is hinged to one end of a link —$H^9$— having its opposite end hinged to the upper end of the lever —$H'$—. It will thus be readily understood to one skilled in the art, that as the hand engaging arm —$H^3$— of the spindle —$H^2$— is rocked upwardly, the brake-shoe —$H'$—, is by means of the links —$H^5$—, —$H^7$—, —$H^9$—, and the levers —$H^6$—, —$H^8$—, —$H'$—, rocked against the adjacent portion of the bearing face —$C^3$— of the adjacent actuating wheel for stopping the rotation of said wheel. One end of the spindle —$H^2$— is pointed, as best seen at Figs. 7 and 13, and is journaled in the hub —$a^{15}$— upon the upper end of the steering rod —$a'$— and the central portion in said spindle is journaled in an arm —$a^{16}$— upon one end of the handle bar —$a^2$—. This arm —$a^{16}$— is formed with a screw-threaded bearing —$a^{17}$— through which the central portion of the brake-spindle —$H^2$— is passed, and with ears —$a^{18}$—$a^{18}$— which project downwardly from said bearing and are clamped together by a bolt —$a^{19}$—. The portion of the brake-spindle within the bearing —$a^{17}$— is formed with an inclining annular shoulder —$H^{10}$— against which bears the end of a nut —$H^{11}$— encircling said spindle and engaged with said screw-threaded bearing —$a^{17}$—. This is a particularly simple, practical and effective form of brake mechanism and adds greatly to the efficiency and practicability of my invention.

The operation of my invention will be readily perceived from the foregoing description and upon reference to the accompanying drawings, and it will be readily understood that its parts are simple in construction, practical and effective in operation, and are durable and strong in use. It will be understood, however, that considerable change may be made in the detail construction and arrangement of the parts thereof without departing from the spirit of my invention.

Having thus fully described my invention, what I claim as new, and desire to secure by Letters Patent, is—

1. In a bicycle of the safety type, the combination with a main framework having a rear driving wheel, an actuating wheel forward of and connected with the driving wheel, and means for rotating the actuating wheel; of a bracing frame comprising inner and outer divisions, the inner division consisting of a horizontal bar attached at its front end to the main framework, between its ends to the bearing at the inner end of the spindle for the actuating wheel, and at its rear end to the axle of the rear wheel, an upwardly inclining bar leading from said spindle bearing to a head secured to the frame work, and the outer division consisting of a rear bar leading from said axle bearing to said head, a rear arm leading from this bearing to the outer bearing for said spindle, and an upwardly extending arm leading from this outer bearing to said inclining bar of the inner division at a point above the actuating wheel, all substantially as described.

2. The combination of a driving wheel, an actuating wheel connected, substanially as described, to the driving wheel for rotating the driving wheel and provided with an annular engaging face, a hinged lever, a rigid stop for limiting the movements of said lever, a movable clutch section or shoe, and adjustable connections between the shoe and said lever, whereby, as the lever is moved, the clutch section is engaged with the wheel for rotating the same, substantially as specified.

3. The combination of a driving wheel, an actuating wheel connected, substantially as described, to the driving wheel for rotating the driving wheel and provided with an inwardly facing annular engaging face having a V-shaped groove, a hinged lever, a rigid stop for limiting the movements of said lever, an outwardly facing movable clutch section or shoe, a facing removably secured to the shoe and of V-shaped cross section to fit said groove, and adjustable connections between the shoe and said lever, whereby, as the lever is moved, the clutch section is engaged with the wheel for rotating the same, substantially as specified.

4. The combination with a frame provided with a pair of spindles having their adjacent extremities separated; of a driving wheel interposed between said spindles, a pair of actuating wheels loosely revoluble on said spindles and connected, substantially as described, to said driving wheel for rotating the same and provided with annular engaging faces, a pair of hinged levers, a flexible connection between said levers, whereby both move simultaneously, movable clutch sections or shoes for engaging the annular faces of the actuating wheels connected to said levers, whereby as one lever moves in one direction, the clutch section connected to the opposite lever engages the corresponding engaging wheel, and a rigid stop for limiting the movements of each shoe in either direction, substantially as set forth.

5. The combination with a frame provided with a pair of spindles having their adjacent extremities separated; of a driving wheel interposed between said spindles provided with pinions on its opposite faces, a pair of actuating wheels loosely revoluble on said spindles and having teeth meshing with said pinions for rotating the driving wheel, a pair of hinged levers, a flexible connection between said levers whereby both move simultaneously, and movable clutch sections or shoes connected to said levers and engaging the annular faces of the actuating wheels on the upstroke of the levers, whereby, as one lever moves in one direction, the clutch section connected to the opposite lever engages the corresponding wheel, substantially as specified.

6. The combination of a wheel provided with an annular engaging face, a hinged lever, a clutch section or shoe for engaging said annular engaging face, a link having one end hinged to the lever and the other hinged to said clutch section, and a rigid stop for limiting the movement of the clutch section or shoe, substantially as specified.

7. The combination of a wheel provided with an annular engaging face, a hinged lever, a clutch section or shoe for engaging said annular engaging face, a link having one end hinged to the lever and the other hinged to said clutch section, a rigid stop carried by the lever, and set screws in the ends of said stop impinging against the shoe for limiting the movement of the clutch section or shoe, substantially as described.

8. The combination with a wheel provided with an annular engaging face, a hinged lever, and a clutch section or shoe having a curved face adapted to fit said engaging face; of a link comprising two telescoping sections with means for adjusting them longitudinally, the link being pivoted at one end to the lever and at the other end to the center of the rear face of said shoe, and a rigid stop having inwardly extending set screws in its ends engaging the shoe, substantially as specified.

9. The combination with a wheel provided with an annular engaging face, a hinged lever, and a clutch section or shoe having a curved face adapted to fit said engaging face; of a link pivoted at one end to the lever and at the other end to the center of the rear face of said shoe, and a rigid stop having inwardly extending set screws in its ends engaging the shoe, substantially as specified.

10. The combination with the frame of a bicycle, a driving wheel in said frame, and a pulley supported by the frame beneath and in rear of the seat support; of a pair of actuating wheels journaled on spindles forward of and geared to the shaft of said driving wheel, clutch levers for moving said actuating wheels, said clutch levers being pivoted on the hubs of the actuating wheels and extending thence forwardly below the seat, a pedal near the front end of each lever, a curved arm rigidly secured to and rising from the lever in rear of said pedal, and a flexible connection leading from the upper ends of said arm over the pulley to the opposite arm, substantially as specified.

11. The combination with a frame provided with a pair of spindles having their adjacent extremities separated, a pulley support on said frame, a driving wheel connected to the frame, a pair of actuating wheels loosely revoluble on said spindles and provided with hubs, and braces connecting said support with the spindles and with the bearings for the driving shaft; of a pulley on said support, a pair of levers loosely hinged upon the hubs of the actuating wheels and provided with curved arms, and a flexible connection having its opposite extremities secured to said arms and its central portion passed over said pulley, substantially as described.

12. The combination with a frame, a clip secured to said frame and having its opposite extremities projecting therefrom, and a pulley support clamped between said extremities and having a rounded spindle; of a pulley whose hub is mounted on said spindle, a set of anti-friction balls between the pulley support and the inner end of the hub, a guide mounted near the outer end of the spindle and surrounding the pulley, a nut on the spindle outside the guide, a set of anti-friction balls between the guide and the outer end of the hub, a driving wheel, a pair of levers connected therewith, and a flexible connection leading from the levers over said pulley, substantially as and for the purpose specified.

13. The combination with a driving wheel, an actuating wheel connected therewith and provided with a projecting hub having a bearing face at its inner end, a spindle passing through the hub and having a bearing face at its inner end, anti-friction balls between these bearing faces, and a frame for supporting the spindle; of a collar surrounding the spindle and having a threaded socket for receiving the outer end of said hub, the collar having a bearing face at its outer end, a jam nut screwed on the hub against the inner end of said collar, a nut at the outer end of the spindle having a bearing face, and anti-friction balls between this bearing face and that of the collar, substantially as described.

14. The combination with a driving wheel, an actuating wheel connected therewith and provided with a projecting hub having a bearing face at its inner end, a spindle passing through the hub and having a bearing face at its inner end, anti-friction balls between these bearing faces, and a frame for supporting the spindle; of a collar surrounding the spindle and having a threaded socket for receiving the outer end of said hub, the collar having a bearing face at its outer end, a nut at the outer end of the spindle having a bearing face, and anti-friction balls between this bearing face and that of the collar, substantially as described.

15. The combination with a driving wheel, an actuating wheel connected therewith and provided with a projecting hub having a bearing face at its inner end, a spindle passing through the hub and having a bearing face at its inner end, anti-friction balls between these bearing faces, a frame for supporting the spindle, a collar surrounding the spindle and having a threaded socket to receive the outer end of said hub, the collar having a bearing face at its outer end, a jam nut screwed on the hub against the inner end of said collar, a nut at the outer end of the spindle having a bearing face, and anti-friction balls between these bearing faces and that of the collar; of a lever having a hub surrounding the wheel hub and collar and provided with bearing faces at its ends, additional bearing faces on the wheel hub and collar adjacent those on the lever hub, anti-friction balls between these two pairs of bearing faces, and connections substantially as described between the lever and actuating wheel, as and for the purpose set forth.

16. The combination with a driving wheel, an actuating wheel connected therewith and provided with a projecting hub, a spindle passing through the hub, a frame for supporting the spindle, a collar surrounding the spindle and having a threaded socket for receiving the outer end of said hub, and a nut at the outer end of the spindle; of a lever having a hub surrounding the wheel hub and collar and provided with bearing faces at its ends, bearing faces on the wheel hub and collar adjacent those on the lever hub, anti-friction balls between these two pairs of bearing faces, and connections, substantially as described, between the lever and actuating wheel, as and for the purpose set forth.

17. The combination of an actuating wheel provided with a projecting hub, a lever having a hub journaled on said hub of the actuating wheel and provided with an opening at one end, a collar movable on said hub of the gear, and a jam nut against the end of the collar and aligned with the opening in the hub of the lever for permitting access through said opening to said nut, substantially as specified.

18. The combination with a spindle; of a wheel having an exteriorly threaded hub journaled on one end of the spindle, a collar journaled on the other end of the spindle and having a threaded recess engaging said hub, and a jam nut on the hub against the inner end of said collar, substantially as specified.

19. The combination of a frame, a clip secured to said frame and having its opposite extremities projecting therefrom, a seat support movable between the opposite extremities of the clip, a pulley support, and a bolt passed through said ears and pulley support for securing the seat support and pulley support to said clip, a pulley mounted on said pulley support, a driving wheel, a pair of levers connected, substantially as described, to actuate said driving wheel, and a flexible connection between said levers having its central portion passed over said pulley, substantially as and for the purpose specified.

20. The combination of a frame, a clip secured to said frame and having its opposite extremities projecting therefrom, a pulley support, and a bolt passed through said ears and pulley support for securing the pulley support to said clip, a pulley mounted on said pulley support, a driving wheel, a pair of levers connected, substantially as described, to actuate said driving wheel, and a flexible connection between said levers having its central portion passed over said pulley, substantially as and for the purpose specified.

21. The combination of a frame, a driving wheel connected, substantially as described, to the frame, a brake-shoe, substantially as described, to stop the rotation of the driving wheel, a handle bar provided with an arm, an oscillating spindle having one end impinging against the frame and its body provided with a conical shoulder facing away from said end, a nut engaged with said arm and formed with a bearing face adapted to bear against said conical shoulder of the spindle, a hand engaging arm on the spindle out of line with its body, a rigid radial arm on the spindle, and connections, substantially as described, between said rigid arm and the brake-shoe, substantially as set forth.

22. The combination of a frame provided with a conical bearing, a driving wheel connected, substantially as described, to the frame, a brake-shoe, substantially as described, to stop the rotation of the driving wheel, a handle bar provided with an arm, a movable spindle having one end formed with a pointed extremity engaged with said conical bearing of the frame and provided with a conical shoulder, a nut engaged with said arm and formed with a bearing face adapted to bear against said conical shoulder of the spindle, a hand-engaging arm on the spindle, and connections substantially as described, between said spindle and the brake-shoe, substantially as set forth.

In testimony whereof I have hereunto signed my name, in the presence of two attesting witnesses, at Syracuse, in the county of Onondaga, in the State of New York, this 23d day of December, 1892.

CHARLES W. SMART.

Witnesses:
CLARK H. NORTON,
M. BAXTER.